73459
PATENTED
JAN 21 1868
L. H. Olmsted's Improved Mode of Lubricating Bearings in Machinery
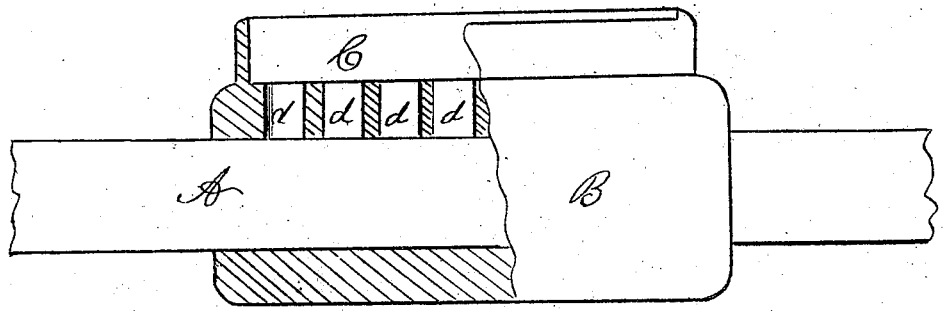
Witnesses
Stephen Briggs
J. Hyatt
Inventor
L. H. Olmsted

United States Patent Office.

LEVERETT H. OLMSTED, OF STAMFORD, CONNECTICUT.

Letters Patent No. 73,459, dated January 21, 1868.

IMPROVEMENT IN LUBRICATING BEARINGS FOR MACHINERY.

The Schedule referred to in these Letters Patent and making part of the same.

TO ALL WHOM IT MAY CONCERN:

Be it known that I, LEVERETT H. OLMSTED, of Stamford, in the county of Fairfield, and State of Connecticut, have invented a new and improved Mode of Lubricating Bearings in Machinery; and I do hereby declare that the following is a full and exact description of the same, reference being had to the accompanying drawing, making a part of this specification, in which is shown a longitudinal elevation of a shaft and box, with a part of the box cut away to show the lubricator-receptacle.

The nature of my invention consists in causing the lubricating material, which is used for lubricating bearings in machinery, to pass through leather, or any other substance that will not allow more to pass through than is necessary to keep the bearings well lubricated.

In the drawing, A represents a shaft, B represents a box for the shaft to revolve in. At C is represented a lubricator-receptacle. $d\ d\ d\ d$ are round apertures at the bottom of the lubricator-receptacle, opening to the interior of the box. These apertures I close with leather, or any other substance that will produce the desired effect.

The usual mode of lubricating bearings in machinery is to pass a small quantity of oil through holes made in some part of the box, and repeat the operation as often as required. By closing these apertures with leather, or a substance which the lubricating material will pass through but slowly, I am enabled to always keep a quantity of it near the bearings, and thereby lubricate the bearings for a long time, without refilling the lubricator-receptacle, as the leather which is placed in the apertures can be compressed so that only what is needed will pass to the bearings.

I do not wish to be understood as confining myself to this particular construction of the lubricator-receptacle, for it is self-evident that in some parts of machinery a different form and other positions would be necessary, and could be made without departing from the original design of the invention; as, for example, when the lubricator-receptacle cannot be attached to the box, it could be suspended over the bearing, and, instead of making the apertures round, one opening could be made the whole length of the lubricator-receptacle, and be closed with leather in the same manner, and in pulleys the lubricator-receptacle could be made in the hub of the pulley, and the orifice near the bearing closed with leather.

I do not claim the lubricator-receptacle.

What I claim as new, and desire to secure by Letters Patent, is—

The lubricator-receptacle C, provided with an opening or openings, said openings being closed with leather, or any other substance that will produce the intended effect, for the purpose set forth.

L. H. OLMSTED.

Witnesses:
STEPHEN BRIGGS,
T. HYATT.